United States Patent [19]
Gale et al.

[11] 3,977,471
[45] Aug. 31, 1976

[54] OIL RECOVERY METHOD USING A SURFACTANT

[75] Inventors: Walter W. Gale, Houston; Rhoderick K. Saunders; Thomas L. Ashcraft, Jr., both of Baytown, all of Tex.

[73] Assignee: Exxon Production Research Company, Houston, Tex.

[22] Filed: Sept. 26, 1975

[21] Appl. No.: 616,981

[52] U.S. Cl.................................. 166/273; 166/275; 252/8.55 D
[51] Int. Cl.² ......................................... E21B 43/22
[58] Field of Search ........................... 166/273–275, 166/305 R, 252; 252/8.55 D

[56] References Cited
UNITED STATES PATENTS

| | | | |
|---|---|---|---|
| 3,431,265 | 3/1969 | Wakeman et al. | 252/8.55 D X |
| 3,799,263 | 3/1974 | Prillieux et al. | 166/275 |
| 3,827,497 | 8/1974 | Dycus et al. | 252/8.55 D X |
| 3,861,466 | 1/1975 | Gale | 166/274 X |
| 3,885,626 | 5/1975 | Gale et al. | 166/274 X |
| 3,885,628 | 5/1975 | Reed et al. | 166/274 X |
| 3,888,308 | 6/1975 | Gale et al. | 166/274 X |
| 3,890,239 | 6/1975 | Dycus et al. | 166/275 X |

*Primary Examiner*—Stephen J. Novosad
*Attorney, Agent, or Firm*—Gary D. Lawson

[57] ABSTRACT

A method is disclosed for recovering oil from a subterranean oil-bearing formation wherein a liquid solution in injected into and driven through the formation and oil is recovered from the formation. The liquid solution contains an effective amount of a surface-active agent having the general formula:

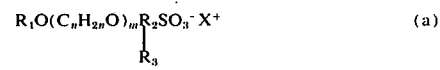

(a)

or

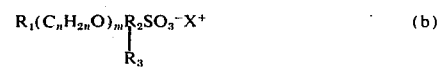 (b)

wherein
$R_1$ is a benzene, toluene, or xylene radical having a linear or branched alkyl substituent containing from 6 to 24 carbon atoms;
$R_2$ is an alkyl, cycloalkyl, alkene or aryl radical containing up to 8 carbon atoms;
$R_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation.

18 Claims, 2 Drawing Figures

OIL RECOVERY METHOD USING A SURFACTANT

BACKGROUND OF THE INVENTION

1. Field of the Invention

This invention relates to a method for recovering oil from a subterranean formation, and more particularly, to an improved flooding process for the recovery of crude oil.

2. Description of the Prior Art

The petroleum industry has recognized for many years that only a portion of the original oil in an oil reservoir can be produced by what is referred to as "primary recovery," i.e., where only initial formation energy is used to recover the crude oil. It is also well-known that conventional methods of supplementing primary recovery are relatively inefficient. Typically, a reservoir retains half its original oil even after the application of currently available "secondary" recovery techniques. Accordingly, there is a continuing need for improved recovery methods which will substantially increase the ultimate yield of petroleum from subterranean reservoirs.

"Waterflooding" is by far the most economical and widely practiced of secondary recovery methods. In such a process, water introduced through injection wells drives oil through the formation to offset producing wells. Much of the current work in secondary recovery technology has been directed toward improving the efficiency of waterflooding processes.

Surface-active agents, or surfactants, have been proposed for improving the efficiency of waterflooding processes. Much of the oil retained in the reservoir after a typical waterflood is in the form of discontinuous globules or discrete droplets trapped within the pore spaces. Because the normal interfacial tension between the reservoir oil and water is so high, these discrete droplets are unable to deform sufficiently to pass through narrow constrictions in the pore channels. When surface-active agents are added to the flooding water, they lower interfacial tension between the water and the reservoir oil and permit oil droplets to deform and flow with the flood water toward producing wells. It is generally accepted that the interfacial tension between the surfactant-containing phase and the reservoir oil must be reduced to less than 0.1 dyne/cm. for effective recovery.

In a waterflood oil-recovery process where the water contains a surfactant, the efficiency of the oil displacement is strongly affected by (1) the rate of surfactant loss, and (2) the surface activity (extent of lowering the oil/water interfacial tension) of the surfactant.

One difficulty in the use of surfactants in general and anionic surfactants in particular is their tendency to be depleted from the injection solution. The surfactants tend to be lost by precipitation as insoluble salts of materials, such as polyvalent metal ions, that may be dissolved in the fluid in the reservoir; by adsorption on the reservoir rocks; and/or by chemical conversion, such as hydrolysis of an active component of the surfactant system to a component that is insoluble, inactive, or detrimental in that system. If the surface-active agent is removed from the waterflood solution as it moves through the reservoir, the agent is not available to act at the oil/water interface. Quite naturally, surfactant depletion decreases oil recovery efficiency.

Another difficulty observed in the use of many anionic surfactants is the inability of the surfactant to exhibit high surface activity in high temperature reservoirs (i.e., temperatures of about 120°F or more) and/or in high salinity environments (i.e., salinities of 2% NaCl or more). Generally, as the temperature of the reservoir and salinity of the brine solution in the reservoir increase, the surface activity of conventional anionic surfactants decreases. Surfactants have been suggested which exhibit some tolerance against either high temperatures or high salinity. None of these surfactants, however, have the ability to exhibit a high degree of surface activity under all types of reservoir conditions, including high salinity or high temperature, or both high temperature and high salinity reservoirs.

A number of approaches have been proposed to combat the problems of excessive surfactant depletion and poor surface activity in high-salinity environments. One approach is to inject a fluid into the reservoir before injecting the surfactant. For example, fresh water would be injected into the reservoir to lower the salinity of the brine in the formation and to reduce water hardness (calcium and magnesium). This approach, however, is not particularly desirable from a technical and economical standpoint. It is often very difficult and expensive to lower the salinity of the formation brine by this method. Another approach is to add a mixture of two (or more) surfactants to a surfactant solution. For example, it was suggested in U.S. Pat. No. 3,811,505, issued to Flournoy et al., that a nonionic surfactant such as polyethoxylated alkyl phenol or polyethoxylated aliphatic alcohol could be injected with an anionic surfactant for improved tolerance to water hardness. One problem with this approach is that the surfactants are sometimes incompatible with each other and/or the formation being flooded. A further problem or objection to the use of two different surfactants is the excessive cost. Still another problem is that chemically different agents will tend to undergo a chromatographic separation. When the surfactants are separated, the desired beneficial results are often lost. Still another approach is to add co-surfactants to anionic surfactants for improved brine tolerance. This approach, however, is not effective in all types of reservoirs.

It would be highly desirable to have a surfactant for water-flooding any oil-bearing reservoir, including reservoirs containing high-salinity brine, wherein the surfactant exhibits a high degree of surface activity with the oil and brine in the reservoir and a low depletion rate as the surfactant passes through the reservoir.

SUMMARY OF THE INVENTION

The present invention relates to a flooding process which alleviates the above problems. In accordance with this invention a process is provided for recovering oil from a subterranean formation wherein fluid containing a surfactant is injected into the formation. The surfactant provides a high degree of surface activity in reservoirs having a high-salinity environment. The surfactant is selected from the group of compounds characterized by the general formula:

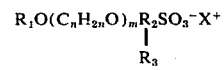

(a)

or

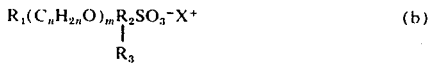

wherein
R$_1$ is a benzene, toluene, or xylene radical having a linear or branched alkyl substituent containing from 6 to 24 carbon atoms;
R$_2$ is an alkyl, cycloalkyl, alkene or aryl radical containing up to 8 carbon atoms;
R$_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation.

The fluid containing the agent of this invention can be used in an aqueous solution, an oil solution, a microemulsion which is miscible with the crude oil and/or formation water, or a microemulsion which is immiscible with the formation crude oil and/or formation water.

The agents as provided in this invention have good resistance to hydrolysis, precipitation, and adsorption when passing through a formation and will effectively reduce interfacial tension between the injected fluid and the in-place crude oil even in a high-temperature reservoir and in a high-salinity environment. These agents therefore will be seen to offer significant advantages over the agents used heretofore.

DESCRIPTION OF A PREFERRED EMBODIMENT

Figure 1:
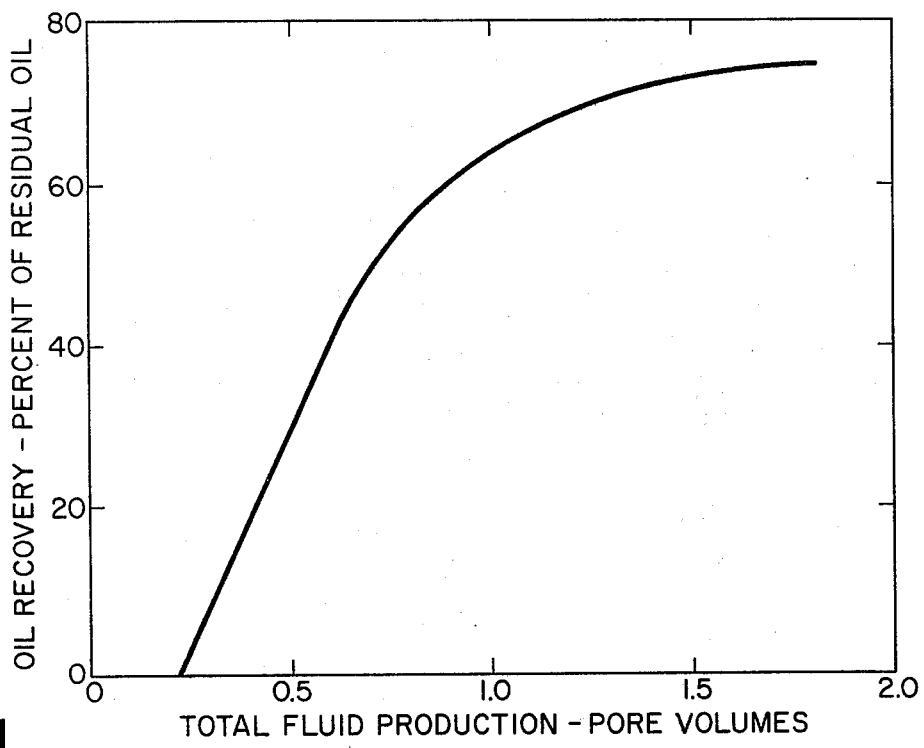
FIGS. 1 and 2 are graphs of the results of core displacement tests showing oil recovery as a function of total fluid production. The oil recovery is expressed as a percent of the residual oil remaining after waterflooding. The total fluid production is the volume of all fluids produced subsequent to waterflooding and is expressed in pore volumes of the cores.

The benefits and advantages which can be obtained in the practice of this invention are achieved through the use of a new and improved class of surface-active agents. As will be discussed in more detail hereinafter, these agents can be used in any type of surfactant flooding process for recovering crude oil from a subterranean oil-bearing formation. They are particularly useful in reservoirs having high salinity brine (i.e., salinities of 2% or more).

In accordance with the practice of this invention there is provided a solution containing an effective amount of surface-active agent selected from the group of compounds having the general formula:

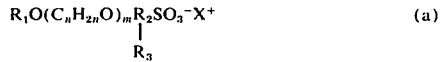

or

wherein

R$_1$ is a benzene, toluene, or xylene radical having a linear or branched alkyl substituent containing from 6 to 24 carbon atoms;
R$_2$ is an alkyl, cycloalkyl, alkene or aryl radical containing up to 8 carbon atoms;
R$_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation.

The compounds which comply with the above formulas will be referred to herein as "compound (a)" and "compound (b)."

Either of these formulas can be prepared in a number of ways. For the sake of brevity and clarity, however, only one method of preparation will be presented herein.

The precursor of compound (a) may be a $C_{6-24}$ phenol, $C_{6-24}$ methyl phenol, or $C_{6-24}$ dimethyl phenol. The symbol $C_{6-24}$ is used herein to designate a linear or branched alkyl radical having from 6 to 24 carbon atoms per molecule. Any isomer or mixtures thereof of these alkylated phenols are suitable in the practice of this invention. The alkylated phenol is reacted with ethylene oxide or propylene oxide to yield either alkyl phenyl oxyethylene ether or alkyl phenyl oxypropylene ether. The number of ethylene oxide or propylene oxide units (i.e., the value of $m$) can be varied as desired.

The oxyalkylated compounds can be prepared by those skilled in the art with techniques well known in the art. In fact, many of these compounds are readily available commercially. For example, ethylene oxide adducts of nonyl phenols having varying numbers of ethylene oxide units are available commercially under the Triton N series from the Rohm & Haas Company, Philadelphia, Pa., and under the name "Igepal" available from GAF Corporation. Also ethylene oxide adducts of octyl phenol are available commercially under Triton X series of Rohm and Haas.

The oxyalkylated compounds are reacted with any suitable alkali metal, including, for example, sodium, potassium, or lithium. The reaction product will be referred to herein as a metal etherate for the sake of brevity.

The metal etherate may be reacted with a large number of compounds to prepare surfactants being generally characterized by compound (a). For example, the metal etherate may be reacted with chloromethyl sulfonate, vinyl sulfonate, 1,3-propane sultone, or 1,4-butane sultone to prepare compounds having a general structure where R$_3$ is a hydrogen atom. The metal etherate may also be reacted with 3-methylpropane sultone, or 4-methyl butane sultone, to prepare compounds having a structural formula where R$_3$ is a methyl group. The metal etherate also may be reacted with hydroxyvinyl sulfonate, 3-hydroxy propane sultone, or 4-hydroxy butane sultone to prepare compounds having a structure where R$_3$ is a hydroxyl group.

The precursor of compound (b) may be $C_{6-24}$ benzene, $C_{6-24}$ methyl benzene, or $C_{6-24}$ dimethyl benzene. Using a substituted benzene rather than a substituted phenol as a precursor is essentially the only difference between the preparation of compound (a) and the preparation of compound (b). The alkylated benzene is reacted with propylene oxide or ethylene oxide to attach units of ethylene or propylene oxide to the benzene ring. Usually, this reaction is accomplished with aluminum chloride or some other Lewis acid. In some instances it may be necessary to further react the oxyalkylated product with additional propylene or ethylene oxide to obtain the desired number of oxide units. After preparation of the oxyalkylated coumpound, compound (b) is prepared in the same manner as described above for the preparation of compound (a).

Various forms of compound (a) can be prepared by the manner previously described. For example, any isomer of dimethyl phenol can be alkylated with a linear of branched olefin having from 6 to 24 carbon atoms. The alkyl dimethyl phenol is reacted with sufficient ethylene oxide such that $m$ has an average value of 1 to 8. This product is then reacted with an alkali metal such as sodium to form a metal etherate. The metal etherate is then contacted with propane sultone in an anhydrous environment to produce a sodium salt of alkyl dimethyl benzene ethoxypropane sulfonate which can be characterized by the formula:

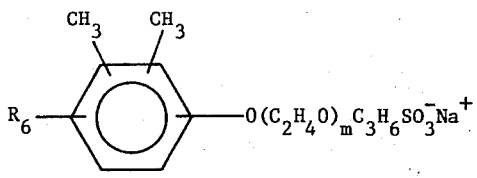

in which $R_6$ is a linear or branched alkyl group having from 6 to 24 carbon atoms and $m$ ranges from 1 to 8. Specific examples of suitable forms of this invention as characterized by the above formula may include: 4-dodecyl-5,6-dimethyl benzene ether $[EO]_{4.2}$ propane sulfonate or 4-dodecyl-2, 6-dimethyl benzene ether $[EO]_{4.2}$ propane sulfonate. The symbol $[EO]_{4.2}$ is used herein to show that the surfactant molecule contains an average of 4.2 ethoxy groups.

For the sake of brevity only two isomers of the above formula are specifically named. It should be understood, however, that any isomer of the compounds of this invention can be used as a surfactant.

The sultones used for the sulfonation of the metal etherate are cyclic esters of hydroxysulfonic acids. The name sultone is derived from their formal resemblance to lactones. Considerable literature has been devoted to sultones and the chemistry of the propane and butane sultones are well-known to the art. See, for example, R. F. Fisher, Industrial and Engineering Chemistry, Vol. 56 No. 3, March 1964, pp. 41–45.

The techniques of alkylation, ethoxylation, and sulfonation which are used to prepare the surfactants of this invention are well-known in the art. Accordingly, the preparation of the surfactants of this invention will not be exemplified further since the techniques for such production as well as some of the materials themselves are well-known.

Various compounds having a general formula as characterized by compounds (a) and (b) can be used in the practice of this invention. Examples of suitable surfactants may include compounds wherein $R_1$ is a 4-octyl phenyl, 4-octyl-5, 6-dimethyl phenyl, 4-octyl-2, 6 dimethyl phenyl, 5-dodecyl-3, 4-dimethyl phenyl or 5-dodecyl-2, 6 dimethyl phenyl radical; $R_2$ is a methyl, ethyl, propyl, butyl, cyclopentyl, cyclohexyl, or benzene radical; $R_3$ can be a hydrogen atom, a methyl, ethyl, propyl, ethenyl, propylenyl or hydroxyl radical; and X can include alkali metals such as sodium, potassium, and lithium, alkaline earth metals such as calcium, and barium, amines including alkanol amines, and ammonium.

As previously discussed, the surface active agents of this invention have good tolerance to high salinity. For example, dodecyl, dimethyl benzene ether $[EO]_4$ propane sulfonate exhibits a high degree of surface activity with oil and water in saline solutions containing from 7 to 14% by weight sodium chloride. This surprising salinity tolerance is of paramount importance in oil recovery processes having a high salinity environment.

To better understand how the surface-active agents of this invention achieve the benefits of this invention it may be helpful to generally discuss the structure of a surfactant and the surfactants of this invention in particular. Most conventional surfactant molecules have an amphiphilic structure. That is, the molecules are composed of groups which have opposite solubility tendencies. For use in oil recovery operations the molecule should have at least one lipophilic or oil-soluble group and at least one hydrophilic or water-soluble group. Since the surface-active properties of a surfactant are closely related to this oil-water solubility, the surfactant should exhibit a high degree of solubilization in both oil and water for effective oil recovery.

Surface-active agents in accordance with this invention can be formulated which exhibit desired oil-water solubility for use in high-temperature reservoirs and/or high-salinity brine environments. As pointed out in the following discussion, such compounds can be formulated by adjusting the relative size of the hydrophilic or lipophilic portion of the surface-active molecule.

Generally, the oil solubility of surfactants is related to the molecular weight of the lipophilic (oil-soluble) portion of the molecule. Since most surfactants' affinity for water increases faster than its affinity for oil as temperature increases, the ability to increase a surfactant's oil solubility can be very important. The surfactants characterized by compounds (a) and (b) can be designed to take into account adverse temperature effects by providing compounds where $R_1$ has a suitable molecular weight to exhibit a desired oil solubility for a particular reservoir temperature.

The hydrophilic portion of a family of surface-active agents characterized by this invention can be adjusted to increase the agent's water solubility. the sulfonate radical is one portion of the surface-active agent which gives the molecule some hydrophilicity. Typically, sulfonated surfactants tend to exhibit a relatively high degree of water solubility. However, if a surfactant must rely only on the sulfonate radical for its hydrophilicity, the surfactant's solubility in brine will decrease as water salinity increases. An ethoxy group positioned between the lipophilic group and the hydrophilic sulfonate group will increase the surfactant's solubility in water; moreover, increasing the number of ethoxy groups will increase the surfactant's water solubility. Also, increasing the number of ethoxy groups will improve the surfactant's solubility in water having a high concentration of inorganic salts such as sodium chloride, magnesium chloride, and calcium chloride. The presence of the ethoxy group in the molecule is believed to be the principal reason for the agent's surprisingly high tolerance to such inorganic salts. Accordingly, surfactants characterized by this invention can be used effectively in high-salinity environments.

The preferred size of the hydrophilic and lipophilic portions of the surface-active agents of this invention will vary depending on several considerations. For example, the chemical and physical characteristics of the formation in which the surfactant will be injected should be considered. For example, if the inorganic salt concentration (e.g., NaCl, $MgCl_2$, or $CaCl_2$) is relatively low, $m$ (the average number of ethoxy groups) may be low. On the other hand, in high salinity environments, $m$ may be much higher. One skilled in the art can determine the type surface-active agent of this invention and the relative hydrophilic-lipophilic balance which will be most effective and efficient in recovering oil from a particular formation.

Surfactants of this invention have a particularly low rate of hydrolysis in the presence of an aqueous liquid at higher reservoir temperatures. When a surfactant hydrolyzes, it tends to be converted to alcohols that are much less soluble and active as surfactants. Generally, the tendency of surfactants to undergo hydrolytic decomposition is strongly affected by an increase in temperature. the surfactants of this invention, however, have particularly good resistance to such decomposition. Laboratory tests have shown, for example, that dodecyl, dimethyl benzene ether $[EO]_4$ propane sulfonate does not hydrolyze in water at 150°F for at least 6 months.

While not wishing to be bound by any specific theoretical explanation for achieving this hydrolysis resistance, it is believed that the disposition of a carbon-containing group, $R_2$, between the $SO_3^-$ group and the $C_2H_4O^-$ group is a factor in achieving this benefit. The $R_2$ group separates the $SO_3^-$ from an oxygen on the $C_2H_4O$ group; thus making the compound a sulfonate surfactant rather than a sulfate surfactant. Sulfonate surfactants, in general, have a higher resistance to hydrolysis than sulfate surfactants.

The surface-active agents of this invention can be used in any flooding process where a surfactant is introduced into a formation for the purpose of recovering crude oil. Accordingly, the process of the present invention finds application in aqueous surfactant solutions. Still further, the surface active agents may be used in liquid hydrocarbon solutions in those recovery techniques in which an oil solvent is employed to provide a miscible displacement of the crude oil within the formation. The surfactants also have applicability in "microemulsions."

The following discussion relates to an embodiment where the surfactants of this invention are used in microemulsions. It should be understood, however, that the surfactants of this invention are not limited to use in microemulsions. Under certain conditions it may be more desirable to use the microemulsions in aqueous or hydrocarbon solutions.

The expression "microemulsion" as used herein is defined as a stable and transparent or translucent micellar solution of oil, and water which may optionally contain one or more electrolytes, and one or more amphiphilic compounds, i.e., a surfactant and optionally one or more co-surfactants. As will be discussed hereinafter, the microemulsions employed in accordance with the present invention may be water-external microemulsions and oil-external microemulsions as well as those micellar structures in which no particular external phase is discernible.

In a simple situation, a microemulsion will contain a refined or crude oil, an aqueous medium, and a surfactant. The surfactant is employed in an amount sufficient to form the microemulsion, i.e., a concentration in excess of a critical micelle concentration. When viewed from the standpoint of a ternary diagram of oil, water, and surfactant, the simplest phase behavior embracing such three components will involve a multiphase region bounded by a continuous binodal curve wherein a single phase exists in the region above the binodal curve, and a multiphase region exists in the region below the binodal curve.

The microemulsion of the present invention can be at least partially miscible with both oil and water. In this case the composition of the microemulsion falls above the binodal curve of the ternary diagram. The microemulsion of this invention can also be mutually immiscible with oil or water or both oil and water. The average composition of such a microemulsion falls on or below the binodal curve of the ternary diagram. When the average composition falls below the binodal curve, at least two mutually immiscible phases in equilibrium are formed with at least one of these phases being a microemulsion. One or more of the microemulsion phases formed from such compositions may be used in the practice of this invention.

Two mportant criteria for a microemulsion composition to be effectively employed in an oil recovery process are (1) the multiphase region should be minimal so as to prolong miscible displacement of the crude oil by the microemulsion, and (2) the interfacial tensions in the multiphase region should be low so as to enhance immiscible displacement when such immiscible displacement occurs. These criteria are well satisfied through the employment of a microemulsion which comprises an oil, an aqueous medium, and a surfactant of the present invention wherein the surfactant is present in an amount sufficient to produce the microemulsion. In this respect the microemulsion in the single phase region of the ternary diagram shows excellent stability and does not readily dilute down to the multiphase region. It also demonstrates a low interfacial tension in the multiphase region to provide for effective and efficient displacement of crude oil within the subterranean formation.

The oil employed in the microemulsion of the present invention can be any refined or crude oil. Typical examples include both sweet and sour crude oils and refined fractions such as side cuts from crude distillation columns, crude column overheads, gas oils, kerosenes, heavy naphthas, straight run gasolines, etc. It is preferred that the oil be one which has physical and chemical characteristics approximating the characteristics of the crude oil of the subterranean formation. The selection of any particular oil can be carried out based upon such considerations as the chemical and physical characteristics of the crude oil in the subterranean formation and the cost of the particular oil.

The aqueous medium employed in the formation of the microemulsion of the present invention can be pure water, but is preferably a brine. Of course, the best salinity for any particular microemulsion system will depend, among other criteria, on the salinity of the formation brine.

The third essential component of the microemulsion of the present invention is a surfactant having a formula as characterized by this invention. A suitable surfactant is dodecyl, dimethyl benzene ether $[EO]_{4.2}$ propane sulfonate.

In preparing the microemulsions of the present invention, the proportions of oil, water, and surfactant are not particularly critical as long as the same are sufficient to provide a microemulsion. Accordingly, the amount of water and the amount of oil can vary within wide limits. It is noted, however, that it has been discovered that the method of the present invention is applicable to both the use of water-external microemulsions and oil-external microemulsions as well as those micellar structures in which no particular external phase is discernible. It has been found that the ability of the microemulsion to effectively displace crude oil in a microemulsion flooding process does not depend upon the form of the external phase. Therefore, in the microemulsions of this invention, it is merely necessary that the surfactant be employed in an amount effective to produce the desired microemulsion. For most purposes, the surfactant is employed in an amount from about 0.1 to about 15% based upon the volume of the microemulsion; the upper limit is based upon economic considerations.

As indicated previously, the microemulsion system can contain one or more co-surfactants. The co-surfactant or co-surfactants may be employed to increase the brine tolerance of the microemulsion and/or to adjust the viscosity of the microemulsion. Generally, the co-surfactant is employed in an amount of from about 0.01 to about 15% based upon the volume of the microemulsion. Many surface-active material having a lipophilic portion and a hydrophilic portion can be effectively utilized as a co-surfactant in the environment of the present invention. The co-surfactants which have been found to be particularly effective are those co-surfactants including, but not being limited to, alcohols, ethoxylated alcohols, sulfated ethoxylated alcohols, sulfonated ethoxylated alcohols, ethoxylated phenols, sulfated ethoxylated phenols, and synthetic sulfonates. The alcohols which are used as co-surfactants are generally $C_{3-20}$ aliphatic alcohols including, for example, isopropanol, isobutanol, t-butanol, the amyl alcohols such as normal amyl alcohol, t-amyl alcohol, and 1 and 2-hexanols, 1 and 2-octanols, and dodecanol.

In addition to the above, fluid containing the surfactants of the present invention can optionally include a thickener for mobility control. Typical thickeners include water-soluble polymers including polysaccharides, as sold under the tradename "Kelzan XC" by Kelco Corporation, and high molecular weight polyacrylamides, more specifically, partially hydrolyzed polyacrylamides as sold under the tradename "Pusher" by Dow Chemical Company. The thickeners are employed in the microemulsion in an amount sufficient to create a favorable mobility ratio between the microemulsion and the fluids being displaced by the microemulsion.

As indicated previously, the surfactants of the present invention are preferably used in microemulsion flooding processes for recovering oil from subterranean formations. Preferably, the microemulsion is injected into the subterranean formation in the form of a slug followed by the injection of thickened water and therafter unthickened water. The slug of microemulsion is injected into the subterranean formation in a size large enough to effectively displace the crude oil in the formation to one or more production wells. Generally, based upon economic considerations, the slug is introduced as a 0.03 to 0.6, preferably a 0.05 to 0.2, pore volume of the formation being flooded by the microemulsion. Those skilled in the art can determine the volume of the formation to be flooded. The thickened water which is injected after the slug of microemulsion can be any conventional thickened water used as a driving fluid in microemulsion processes. To avoid a "fingering" effect, it is preferred that the mobility of the thickened water not exceed the mobility of the microemulsion slug. Following the injection of thickened water, unthickened water is injected as a flooding medium. The thickened water and unthickened water are injected in amounts which may vary widely, but amounts up to two pore volumes of total water injected are applicable.

The thickened water and unthickened water act as driving fluids to drive the microemulsion slug through the subterranean formation wherein the microemulsion slug displaces crude oil trapped therein. The displaced oil is driven to the production means and thence to the surface of the earth.

Reference is now made to the following examples which are presented for the purpose of illustration only. The invention is in no way to be deemed to be limited to these examples. In the examples brine, surfactant, and alcohol concentrations are presented as percent by weight.

EXAMPLE I

This example is presented to illustrate the ability of a single-phase microemulsion of the present invention to reduce the residual oil content from a porous medium. The microemulsion was injected into a Berea sandstone core to determine the efficiency of an oil recovery process. The core used in these tests was a section of Berea sandstone having a cross-section of 1 by 1 inch and a length of 48 inches. The core had a permeability to brine of approximately 400 millidarcies and was mounted in Epoxy with tap-fittings at each end for injection and production of fluids.

Prior to conducting the displacement test, the cores were flooded with oil and brine to approximate the oil and water saturations that would exist in an oil reservoir which had been flooded to the point that no further oil could be produced. In this flooding operation, the core was first saturated with a brine solution. The core was then flooded with a mixture of Isopar-M and Heavy Aromatic Naphtha (HAN) in a ratio of 9/1 until no further brine could be produced. Isopar-M and Heavy Aromatic Naphtha are trade names for refined paraffinic and aromatic oils, respectively, sold by Exxon Company, U.S.A. The core was then once again flooded with brine to remove all of the oil which could be recovered by this conventional water-flooding process. At this point the quantities of oil and water remaining in the cores approximated those in a reservoir which had been water-flooded to a residual oil saturation. The residual oil in this core was approximately 32% of the pore volume of the core; the remaining 68% was saturated with brine.

After the core had been water-flooded to a residual oil saturation, a displacement test was conducted on the core. A microemulsion solution containing the following composition was injected into the water-flooded core:

91% brine solution containing 6% by weight sodium chloride,
5% oil, a 90/10 Isopar-M/HAN mixture,
3% dodecyl, dimethyl benzene ether $[EO]_{4.2}$ propane sulfonate,
1% butyl alcohol.

Injection of this microemulsion solution was continued until approximately 0.25 pore volumes of fluid had been injected. The microemulsion solution was followed by a brine solution containing about 750 ppm Kelzan XC and 6% sodium chloride until a total of approximately 0.7 pore volumes had been injected into the core. The viscosity of this brine solution was about 12 centipoises. The thickened brine solution was followed by a brine solution containing 6% sodium chloride until approximately 2.0 pore volumes of fluid had been produced from the core. These fluids were injected at an average frontal velocity of approximately one foot per day.

FIG. 1 graphically illustrates the results of the above displacement test. FIG. 1 shows the relation between the percent of residual oil recovered and pore volumes of fluid produced. The FIGURE shows that about 75% of the residual oil in the core can be recovered after producing about 1.8 pore volumes of fluid. The oil saturation in the Berea core was reduced from about 32% pore volume to less than 10% pore volume.

EXAMPLE II

A 4 foot Berea core having a permeability to brine of about 400 millidarcies was prepared in the same manner as described in Example 1. The Berea core containing residual Isopar-M/HAN was contacted with a 1.54 PV bank of a microemulsion having the following composition:

1% dodecyl, dimethyl benzene ether $[EO]_{4.2}$ propane sulfonate,
5% 90/10 Isopar-M/HAN,
93% water containing 6% NaCl, and
1% isobutyl alcohol.

The 1.54 PV bank of microemulsion was followed by water containing 750 ppm Kelzan XC and 6% sodium chloride. The viscosity of this solution was about 12 centipoises.

Figure 2:
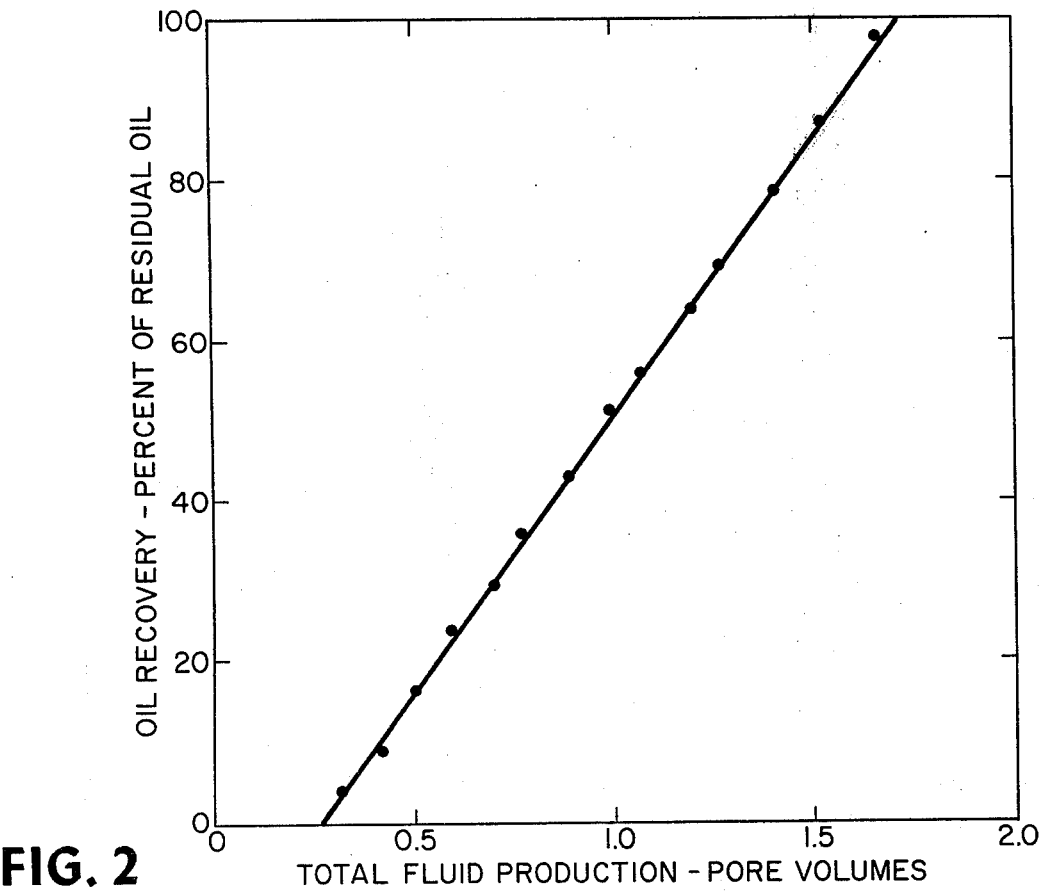

FIG. 2 illustrates the results of this example. Plotted in FIG. 2 is the relation between residual oil recovered in percent and the pore volumes of fluid produced during the example. After about 1.7 PV of fluid had been produced, almost all of the residual oil had been removed from the Berea core.

As can be observed from FIGS. 1 and 2 more complete oil recovery was obtained in Example II than was obtained in Example I. This difference can be at least partially attributed to the larger pore volume of microemulsion used in Example II than was used in Example I.

The principle of the invention and the best mode contemplated for applying that principle have been described. It is to be understood that the foregoing is illustrative only and that other means and techniques can be employed without departing from the true scope of the invention defined in the following claims.

What we claim is:

1. A method for recovering oil from an oil-bearing formation which comprises injecting into the formation a fluid containing an effective amount of surface-active agent having the general formula:

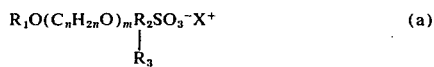   (a)

or

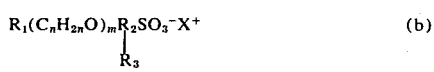   (b)

wherein
$R_1$ is a benzene, toluene, or xylene radical having a linear or branched alkyl substituent containing from 6 to 24 carbon atoms;
$R_2$ is an alkyl, cycloalkyl, alkene or aryl radical containing up to 8 carbon atoms;
$R_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation.

2. The method as defined in claim 1 in which said surface-active agent is employed in an amount from about 0.01 to about 15 weight percent of said fluid solution.

3. The method as defined in claim 1 in which the fluid is employed in an amount from about 0.01 to about 2 pore volumes.

4. The method as defined in claim 1 in which said fluid is aqueous.

5. The method as defined in claim 4 wherein said aqueous fluid contains sodium and chloride ions.

6. The method as defined in claim 5 wherein the aqueous fluid has a salt concentration of up to about 14 weight percent.

7. The method as defined in claim 1 wherein $R_1$ has the formula:

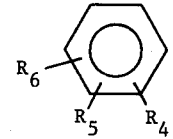

in which
$R_4$ is an alkyl group having from 6 to 24 carbon atoms;
$R_5$ and $R_6$ are the same or different and each is a hydrogen atom or methyl group.

8. A method for producing oil from an oil-bearing formation which comprises injecting into the formation a fluid containing a surface-active agent having the formula:

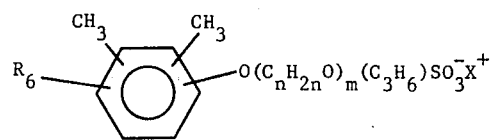

in which
$R_6$ is an alkyl group having from 6 to 24 carbon atoms;
$n$ has a value of 2 or 3;
$m$ has an average value of from 2 to 8; and
X is a cation.

9. The method as defined in claim 8 wherein $R_6$ is $C_{12}H_{25}$, $m$ has a value of from 3.0 to 6.0, and X is sodium.

10. The method as defined in claim 8 in which said agent is employed in an amount from 0.01 to about 5 weight percent of said fluid.

11. The method as defined in claim 8 in which a fluid is employed in an amount from 0.01 to about 2 pore volumes.

12. The method as defined in claim 8 in which said aqueous fluid comprises brine.

13. A method for producing oil from an oil-bearing formation which comprises injecting into the formation a solution containing a surface-active agent having the formula:

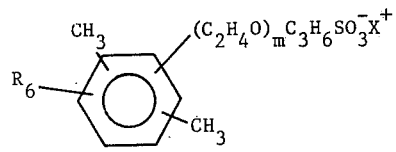

in which
R$_6$ is an alkyl group having 6 to 24 carbon atoms;
$m$ has an average value of from 2 to 8; and
X is a cation;
driving said fluid through said formation to displace oil from said formation; and recovering the displaced oil.

14. In a secondary or tertiary method of recovering crude oil from a subterranean formation wherein a microemulsion solution is injected into the formation through at least one injection means to displace crude oil in the formation toward at least one production means, the improvement wherein said microemulsion comprises an oil, an aqueous medium, and in amounts sufficient to produce a single-phase microemulsion a surfactant characterized by the formula:

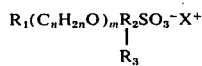

wherein
R$_1$ is a benzene, toluene, or xylene radical having a linear or branched alkyl substituent containing from 6 to 24 carbon atoms;
R$_2$ is an alkyl, cycloalkyl, alkene or aryl radical containing up to 8 carbon atoms;
R$_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation;
driving said microemulsion solution through said formation to displace oil from said formation and recovering the displaced oil.

15. The method as defined in claim 14 wherein said surfactant is an isomer of dodecyl dimethyl benzene ether ethoxy propane sulfonate.

16. The method as defined in claim 14 wherein said aqueous medium is a brine with a salt concentration up to about 14 percent by weight.

17. The method as defined in claim 14 wherein said microemulsion further contains a co-surfactant.

18. A method of recovering residual oil from a subterranean formation which has been subjected to primary depletion and waterflooding which comprises: injecting into the flooded out formation through at least one injection means in fluid communication with at least one production means a slug of a single-phase microemulsion comprising an oil and aqueous medium and in an amount sufficient to produce said single-phase microemulsion a surfactant being characterized by the formula:

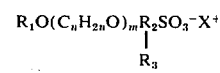

wherein
R$_1$ is a benzene, toluene, or xylene radical having a linear or branched alkyl substituent containing from 6 to 24 carbon atoms;
R$_2$ is an alkyl, cycloalkyl, alkene or aryl radical containing up to 8 carbon atoms;
R$_3$ is a hydrogen atom, a hydroxyl radical, or an aliphatic radical containing from 1 to 8 carbon atoms;
$n$ has a value of 2 or 3;
$m$ has an average value of from 1 to 20; and
X is a cation;
said microemulsion being capable of displacing residual crude oil in said formation toward said production means; thereafter injecting thickened water to drive said slug of microemulsion through said formation toward said production means; injecting unthickened water subsequent to the injection of said thickened water; and recovering residual crude oil through said production means.

* * * * *